Jan. 10, 1961  C. BAUR ET AL  2,967,459
PHOTOGRAPHIC WIDE ANGLE OBJECTIVE
Filed April 9, 1958
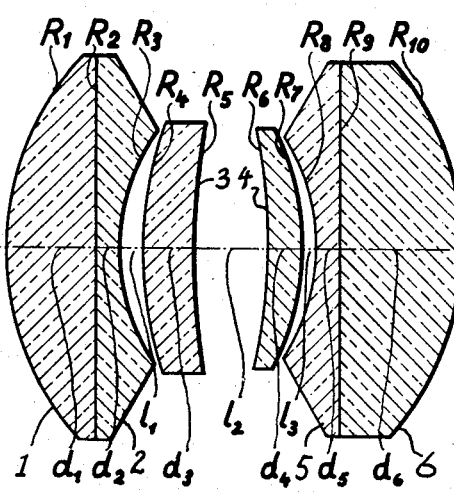
INVENTOR.
Carl Baur, Christian Otzen United States Patent Office 2,967,459
Patented Jan. 10, 1961

2,967,459

PHOTOGRAPHIC WIDE ANGLE OBJECTIVE

Carl Baur, Munich-Baldham, and Christian Otzen, Munich, Germany, assignors to Agfa Aktiengesellschaft, Leverkusen, Germany Filed Apr. 9, 1958, Ser. No. 727,467

Claims priority, application Germany Apr. 18, 1957

4 Claims. (Cl. 88—57)

The present invention relates to a photographic wide angle objective, and more particularly to a photographic wide angle objective comprising four lens members which are axially spaced from each other by air spaces, so that two inner lens members are located between two outer lens members. The outer lens members are cemented negative meniscus doublets, and the inner lens members are positive meniscus singlets. A diaphragm is normally located between the inner lens members.

Photographic objectives of this type are known, and it is one object of the present invention to improve photographic wide angle objectives of this type.

The wide angle objectives of this type according to the known art, have a maximal aperture of 1:4.5 with a useful angle of field of 70°, or a maximal aperture of 1:4 with a useful angle of field of 60°. The objectives according to the known art have the following disadvantages:

(a) The rear intercept length is less than 83% of the focal length of the objective as a whole.

(b) The axial air space between the inner lens members in which the diaphragm is placed, is less than 4.2% of the focal length of the objective. The radii of curvature of the inner faces of the members which are located on opposite sides of the diaphragm are comparatively small, and consequently the objectives according to the prior art do not permit to build a central shutter into the objective.

(c) The radii of the cemented interfaces of the front and rear members are comparatively small, and frequently smaller than 80% of the focal length of the objective, so that the objectives according to the prior art are difficult and expensive to produce.

Consequently, it is another object of the present invention to increase the rear intercept length of a wide angle objective of this type to over 86% of the focal length of the objective, while at the same time increasing the aperture and useful angle of field.

Another object of the present invention is to provide a wide angle objective which has an aperture of 1:3.5 with an angle of field of 64°.

Another object of the present invention is to provide a wide angle objective having an aperture of 1:4 with an angle of field of 72°.

A further object of the preesnt invention is to provide an axial air space between the inner lens members which is sufficiently great to permit the use of a central shutter, and to provide for the same purpose comparatively large radii of curvature of the inner faces of the inner lens members.

For example, in one embodiment of the present invention, the axial air space between the inner lens members is more than 7% of the focal length of the objective.

It is another object of the present invention to provide planar cemented interfaces for the front and rear members of the objective in order to facilitate the making of the objective.

With these objects in view, the present invention mainly consists in a photographic wide angle objective having an aperture of at least 1:4 and comprising four lens members axially spaced from each other by air spaces, two of the lens members being outer members located at the front and at the rear of the objective, respectively, and two of the lens members being inner members located, respectively, inwardly of the outer members. Each outer member is a cemented negative meniscus doublet consisting of an outwardly located convergent element and of an inwardly located divergent element. The divergent elements of the doublets have greater dispersion than the convergent elements.

The difference between the absolute values of the radii of curvature of the outer faces of the convergent elements, the difference between the absolute values of the radii of curvature of the inner faces of the divergent elements, and the difference between the absolute values of the radii of curvature of the cemented interfaces of the outer members being, respectively, not more than 2% of the focal length of the objective as a whole.

Th inner members are positive meniscus singlets having confronting inner faces between which a diaphragm is preferably arranged. The inner faces of the inner members are concave with respect to each other.

In accordance with the present invention, the sum of the absolute values of the radii of curvature of the inner faces of the inner members is smaller than two times and greater than 1.2 the focal length of the objective as a whole, and the axial air space between the inner faces of the inner members is smaller than one tenth, and greater than six hundredth of the focal length of the objective as a whole.

Preferably, the cemented interfaces of the cemented doublets are planar.

The novel features which are considered as characteristic for the present invention are set forth in particular in the appended claims. The invention and additional objects and advantages thereof, will be best understood from the following description of specific embodiments when read in connection with the accompanying drawing. The single figure of the drawing shows a side view of a wide angle objective according to one embodiment of the present invention.

Referring now to the drawing, one outer lens member is located in front and is a negative meniscus doublet consisting of a convergent lens element 1 which is cemented at a planar interface to the divergent lens elements 2. The other outer lens member is also a negative meniscus doublet consisting of a divergent lens element 5 which is cemented at a planar interface to a convergent lens element 6.

Lens element 1 has a thickness $d_1$, lens element 2 has a thickness $d_2$, lens element 5 has a thickness $d_5$, and lens element 6 has a thickness $d_6$.

The front face of lens element 1 has a radius of curvature $R_1$, the rear face of lens element 1, and the front face of lens element 2 has a radius of curvature $R_2$, which is infinite, and the rear face of lens element 2 has a radius of curvature $R_3$. The front face of lens element 5 has a radius of curvature $R_8$, the rear face of lens element 5, and the front face of lens element 6 have a radius of curvature $R_9$ which is infinite, and the rear face of lens element 6 has a radius of curvature $R_{10}$.

The forwardly located inner lens member 3 is spaced an axial air space $l_1$ from the lens element 2, and is spaced an axial air space $l_2$ from the rearwardly located inner lens element 4. Lens element 4 is spaced an axial air space $l_3$ from lens element 5. The thickness of lens elements 3 and 4 are $d_3$ and $d_4$ respectively.

The front face of lens element 3 has a radius of curvature $R_4$, and the rear face of lens element 3 has a radius of curvature $R_5$. The front face of lens element 4 has a radius of curvature $R_6$, and the rear face of lens element 4 has a radius of curvature $R_7$.

The difference between the absolute values of the radii of curvature $R_1$ and $R_{10}$ is not greater than 2% of the focal length $f$ of the objective as a whole, which may be mathematically expressed as follows:

(1)    $(R_1-R_{10})<0.02\ f$

The difference between the absolute values of the radii of curvature $R_2$ and $R_9$ is not greater than 2% of the focal length $f$ of the objective, which may be mathematically expressed as follows:

(2)    $(R_2-R_9)<0.02\ f$

The difference between the absolute values of the radii of curvature $R_3$ and $R_8$ is not more than 2% of the focal length of the objective which may be mathematically expressed as follows:

(3)    $(R_3-R_8)<0.02\ f$

As explained above, the wide angle objectives according to the present invention have an aperture of at least 1:4, for example, an aperture of 1:3.5 for an angle of field of 64°, and 1:4 for an angle of field of 72°.

In order to utilize the great aperture for the great angle of field, and considering the necessary correction of astigmatism and coma, the following constructive features are incorporated into the wide angle objectives of the present invention.

The sum of the absolute values of the radii of curvature $R_5$ and $R_6$ is smaller than two times, and greater than 1.2 times the focal length of the objective as a whole, which may be mathematically expressed as follows:

(4)    $2\ f>(R_5+|R_6|)>1.2\ f$

The axial air space $l_2$ between lens elements 3 and 5 is smaller than one-tenth and greater than six-hundreth of the focal length of the objective, which may be mathematically expressed as follows:

(5)    $0.1\ f>l_2>0.06\ f$

In order to further improve the correction of the objective, and particularly in order to facilitate the manufacture of the objective, the radii $R_2$ and $R_9$ of the cemented interfaces are infinite, which may be mathematically expressed as follows:

(6)    $R_2=R_9=\infty$

The correction of the objective is further improved if the thickness $d_3$ of lens element 3 is greater than the thickness $d_4$ of lens element 4, but smaller than twice the thickness $d_4$ of lens element 4, which may be mathematically expressed as follows:

(7)    $2d_4>d_3>d_4$

It is advantageous to make the radius $R_4$ of lens element 3 smaller than twice the radius $R_7$ of lens element 4, but greater than 1.3 times radis $R_7$, which may be mathematically expressed as follows:

(8)    $2|R_7|>R_4>1.3|R_7|$

The quality of the image as regards astigmatism and coma is further improved by making the axial air space $l_1$ between lens elements 2 and 3 greater than the axial air space $l_3$ between lens elements 4 and 5, but smaller than three times the axial air space $l_3$, which may be mathematically expressed as follows:

(9)    $3\ l_3>l_1>l_3$

When the above principles of construction are incorporated into the objective, the objective is uniformly corrected to such extent that it is hardly possible to improve the image quality and definition of the fully opened objective by reducing the aperture of the diaphragm.

The following examples are illustrative for the wide angle objectives according to the present invention.

*Example 1*

Aperture 1:3.5, angle of field 64°, and rear intercept length 0.86490. The focal length of the objective is assumed to be 1.000.

| Lens Elements | Radii | Thicknesses | $n_D$ | $v$ |
|---|---|---|---|---|
| 1 | $R_1=+0.28417\cdot f$ | $d_1=0.08596\cdot f$ | $n_1=1.69350$ | $v_1=53.4$ |
|   | $R_2=\infty\cdot f$ |  |  |  |
| 2 | $R_3=+0.20166\cdot f$ | $d_2=0.02686\cdot f$ | $n_2=1.62374$ | $v_2=47.0$ |
|   |  | $l_1=0.02177\cdot f$ |  |  |
| 3 | $R_4=+0.40762\cdot f$ | $d_3=0.05174\cdot f$ | $n_3=1.54869$ | $v_3=45.4$ |
|   | $R_5=+0.81033\cdot f$ | $l_2=0.07239\cdot f$ |  |  |
|   | $R_6=-0.55519\cdot f$ |  |  |  |
| 4 | $R_7=-0.26899\cdot f$ | $d_4=0.03536\cdot f$ | $n_4=1.52944$ | $v_4=51.8$ |
|   |  | $l_3=0.01357\cdot f$ |  |  |
| 5 | $R_8=-0.20426\cdot f$ | $d_5=0.02375\cdot f$ | $n_5=1.64769$ | $v_5=33.9$ |
|   | $R_9=\infty\cdot f$ |  |  |  |
| 6 |  | $d_6=0.12045\cdot f$ | $n_6=1.71700$ | $v_6=47.9$ |
|   | $R_{10}=-0.28363\cdot f$ |  |  |  |

In the above table, $n_D$ is the index of refraction for D line of the spectrum, that is for a wave length of 587.6 mu. The dispersive index is $v_1$ to $v_6$ for the lens elements 1 to 6, respectively.

*Example 2*

Aperture 1:4, angle of field 72°, and rear intercept length 0.86845. The focal length of the objective is assumed to be 1.000.

| Lens Elements | Radii | Thicknesses | $n_D$ | $v$ |
|---|---|---|---|---|
| 1 | $R_1=+0.28890\cdot f$ | $d_1=0.08748\cdot f$ | $n_1=1.69100$ | $v_1=54.8$ |
|   | $R_2=\infty\cdot f$ |  |  |  |
| 2 | $R_3=+0.20559\cdot f$ | $d_2=0.02424\cdot f$ | $n_2=1.62374$ | $v_2=47.0$ |
|   |  | $l_1=0.01897\cdot f$ |  |  |
| 3 | $R_4=+0.44111\cdot f$ | $d_3=0.05902\cdot f$ | $n_3=1.58215$ | $v_3=42.0$ |
|   | $R_5=+0.87607\cdot f$ | $l_2=0.07378\cdot f$ |  |  |
|   | $R_6=-0.56540\cdot f$ |  |  |  |
| 4 | $R_7=-0.27388\cdot f$ | $d_4=0.04216\cdot f$ | $n_4=1.52944$ | $v_4=51.8$ |
|   |  | $l_3=0.01054\cdot f$ |  |  |
| 5 | $R_8=-0.20824\cdot f$ | $d_5=0.02108\cdot f$ | $n_5=1.64769$ | $v_5=33.9$ |
|   | $R_9=\infty\cdot f$ |  |  |  |
| 6 |  | $d_6=0.11576\cdot f$ | $n_6=1.71700$ | $v_6=47.9$ |
|   | $R_{10}=-0.28379\cdot f$ |  |  |  |

It will be understood that each of the elements described above, or two or more together, may also find a useful application in other types of wide angle objectives differing from the types described above.

While the invention has been illustrated and described as embod.ed in a photographic wide angle objective in which the lens surfaces located opposite a diaphragm are curved and spaced in a particular ratio with respect to the focal length of the objective, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be secured by Letters Patent is:

1. A photographic wide angle objective having an aperture of 1:3.5, an angle of field of 64°, and a rear intercept length of 0.86490, the objective being constructed substantially according to the specifications in the following table:

| Lens Elements | Radii | Thicknesses | $n_D$ | $v$ |
|---|---|---|---|---|
| 1 | $R_1 = +0.28417 \cdot f$ | $d_1 = 0.08596 \cdot f$ | $n_1 = 1.69350$ | $v_1 = 53.4$ |
|   | $R_2 = \infty \cdot f$ | | | |
| 2 | | $d_2 = 0.02686 \cdot f$ | $n_2 = 1.62374$ | $v_2 = 47.0$ |
|   | $R_3 = +0.20166 \cdot f$ | $l_1 = 0.02177 \cdot f$ | | |
|   | $R_4 = +0.40762 \cdot f$ | | | |
| 3 | | $d_3 = 0.05174 \cdot f$ | $n_3 = 1.54869$ | $v_3 = 45.4$ |
|   | $R_5 = +0.81033 \cdot f$ | $l_2 = 0.07239 \cdot f$ | | |
|   | $R_6 = -0.55519 \cdot f$ | | | |
| 4 | | $d_4 = 0.03506 \cdot f$ | $n_4 = 1.52944$ | $v_4 = 51.8$ |
|   | $R_7 = -0.26899 \cdot f$ | $l_3 = 0.01357 \cdot f$ | | |
|   | $R_8 = -0.20426 \cdot f$ | | | |
| 5 | | $d_5 = 0.02375 \cdot f$ | $n_5 = 1.64769$ | $v_5 = 33.9$ |
|   | $R_9 = \infty \cdot f$ | | | |
| 6 | | $d_6 = 0.12045 \cdot f$ | $n_6 = 1.71700$ | $v_6 = 47.9$ |
|   | $R_{10} = -0.28362 \cdot f$ | | | | wherein the first column lists six lens elements in numerals in order from the front to the rear; wherein $f$ is the focal length of the objective, $n_D$ is the index of refraction for the D line of the spectrum, and $v$ is the dispersive index; and wherein R, $d$, and $l$ refer, respectively, to the radii of curvature of the refractive surfaces, the axial thicknesses of the lens elements, and the axial air spaces between the lenses, the subscripts on the characters R, $d$ and $l$ being numbered consecutively from the front to the rear, and the plus and minus signs in the second column corresponding to refractive surfaces which are respectively convex and concave to the front.

2. A photographic wide angle objective having an aperture of 1:4, an angle of field of 72° and a rear intercept length of 0.86845, the objective being constructed substantially according to the specifications in the following table:

| Lens Elements | Radii | Thicknesses | $n_D$ | $v$ |
|---|---|---|---|---|
| 1 | $R_1 = +0.28890 \cdot f$ | $d_1 = 0.08748 \cdot f$ | $n_1 = 1.69100$ | $v_1 = 54.8$ |
|   | $R_2 = \infty \cdot f$ | | | |
| 2 | | $d_2 = 0.02424 \cdot f$ | $n_2 = 1.62374$ | $v_2 = 47.0$ |
|   | $R_3 = +0.20559 \cdot f$ | $l_1 = 0.01897 \cdot f$ | | |
|   | $R_4 = +0.44111 \cdot f$ | | | |
| 3 | | $d_3 = 0.05902 \cdot f$ | $n_3 = 1.58215$ | $v_3 = 42.0$ |
|   | $R_5 = +0.87607 \cdot f$ | $l_2 = 0.07378 \cdot f$ | | |
|   | $R_6 = -0.56540 \cdot f$ | | | |
| 4 | | $d_4 = 0.04216 \cdot f$ | $n_4 = 1.52944$ | $v_4 = 51.8$ |
|   | $R_7 = -0.27388 \cdot f$ | $l_3 = 0.01054 \cdot f$ | | |
|   | $R_8 = -0.20824 \cdot f$ | | | |
| 5 | | $d_5 = 0.02108 \cdot f$ | $n_5 = 1.64769$ | $v_5 = 33.9$ |
|   | $R_9 = \infty \cdot f$ | | | |
| 6 | | $d_6 = 0.11576 \cdot f$ | $n_6 = 1.71700$ | $v_6 = 47.9$ |
|   | $R_{10} = -0.28379 \cdot f$ | | | | wherein the first column lists six lens elements in numerals in order from the front to the rear; wherein $f$ is the focal length of the objective, $n_D$ is the index of refraction for the D line of the spectrum, and $v$ is the dispersive index; and wherein R, $d$, and $l$ refer, respectively, to the radii of curvature of the refractive surfaces, the axial thicknesses of the lens elements, and the axial air spaces between the lenses, the subscripts on the characters R, $d$ and $l$ being numbered consecutively from the front to the rear, and the plus and minus signs in the second column corresponding to refractive surfaces which are respectively convex and concave to the front.

3. A wide angle objective, comprising two cemented negative meniscus doublets arranged at the front and at the rear of the objective, respectively, and two positive meniscus singlets located between said doublets spaced from the same by axial air spaces, the objective being constructed substantially according to the specifications in the following tables, wherein $f$ is the focal length of the objective; wherein the first column lists six lens elements in numerals in order from the front to the rear, wherein the second column lists the indices of refraction $n_D$ of the lens elements for the D line of the spectrum, and wherein the third column lists the dispersive indices $v$ of the lens elements; and wherein R, $d$ and $l$ refer, respectively, to the radii of curvature of the refractive surfaces, the axial thicknesses of the lens elements and the axial air spaces between said singlets and doublets, the subscripts on the characters R, $d$ and $l$ being numbered consecutively from the front to the rear, and the plus and minus signs in the fifth column corresponding to refractive surfaces which are respectively convex and concave to the front, the thicknesses $d$ and the air spaces $l$ differing not more than $\pm 0.02\ f$ from the numerical values listed in the table; wherein $$\frac{\Delta n}{R}$$

is the power of refraction of the respective surfaces of the lens elements, the respective powers of refraction differing less than $\pm 0.2/f$ from the numerical values listed in the table in the sixth column:

| Lens Elements | $n_D$ | $v$ | Thicknesses | Radii | $\frac{\Delta n}{R}$ |
|---|---|---|---|---|---|
| 1 | 1.69350 | 53.4 | $d_1 = 0.08593 \cdot f$ | $R_1 = +0.28417 \cdot f$ | $+2.4404/f$ |
|   |   |   |   | $R_2 = \infty \cdot f$ | $0.00000/f$ |
| 2 | 1.62374 | 47.0 | $d_2 = 0.02686 \cdot f$ | $R_3 = +0.20166 \cdot f$ | $-3.09303/f$ |
|   |   |   | $l_1 = 0.02177 \cdot f$ | $R_4 = +0.40762 \cdot f$ | $+1.34608/f$ |
| 3 | 1.54869 | 45.4 | $d_3 = 0.05174 \cdot f$ | $R_5 = +0.81033 \cdot f$ | $-0.67712/f$ |
|   |   |   | $l_2 = 0.07239 \cdot f$ | $R_6 = -0.55519 \cdot f$ | $-0.95362/f$ |
| 4 | 1.52944 | 51.8 | $d_4 = 0.03503 \cdot f$ | $R_7 = -0.23899 \cdot f$ | $+1.96825/f$ |
|   |   |   | $l_3 = 0.01357 \cdot f$ | $R_8 = -0.20426 \cdot f$ | $-3.17091/f$ |
| 5 | 1.64769 | 33.9 | $d_5 = 0.02375 \cdot f$ | $R_9 = \infty \cdot f$ | $0.00000/f$ |
| 6 | 1.71700 | 47.9 | $d_6 = 0.12045 \cdot f$ | $R_{10} = -0.28363 \cdot f$ | $+2.52794/f$ |

4. A wide angle objective, comprising two cemented negative meniscus doublets arranged at the front and at the rear of the objective, respectively, and two positive meniscus singlets located between said doublets spaced from the same by axial air spaces, the objective being constructed substantially according to the specifications in the following table, wherein $f$ is the focal length of the objective; wherein the first column lists six lens elements in numerals in order from the front to the rear, wherein the second column lists the indices of refraction $n_D$ of the lens elements for the D line of the spectrum, and wherein the third column lists the dispersive indices $v$ of the lens elements; and wherein R, $d$ and $l$ refer, respectively, to the radii of curvature of the refractive surfaces, the axial thicknesses of the lens elements and the axial air spaces between said singlets and doublets, the subscripts on the characters R, $d$ and $l$ being numbered consecutively from the front to the rear, and the plus and minus signs in the fifth column corresponding to refractive surfaces which are respectively convex and concave to the front, the thicknesses $d$ and the air spaces $l$ differing not more than $\pm 0.02\ f$ from the numerical values listed in the table; wherein $$\frac{\Delta n}{R}$$

is the power of refraction of the respective surfaces of the lens elements, the respective powers of refraction differing less than $\pm 0.2/f$ from the numerical values listed in the table in the sixth column:

| Lens Elements | $n_D$ | $v$ | Thicknesses | Radii | $\frac{\Delta n}{R}$ |
|---|---|---|---|---|---|
| 1 | 1.69100 | 54.8 | $d_1 = 0.08748 \cdot f$ | $R_1 = +0.28890 \cdot f$ | $+2.39183/f$ |
|   |         |      |                         | $R_2 = \infty \cdot f$   | $0.00000/f$ |
| 2 | 1.62374 | 47.0 | $d_2 = 0.02424 \cdot f$ | $R_3 = +0.20559 \cdot f$ | $-3.03390/f$ |
|   |         |      | $l_1 = 0.01897 \cdot f$ |                         |              |
| 3 | 1.58215 | 42.0 | $d_3 = 0.05902 \cdot f$ | $R_4 = +0.44111 \cdot f$ | $+1.31974/f$ |
|   |         |      | $l_2 = 0.07378 \cdot f$ | $R_5 = +0.87607 \cdot f$ | $-0.66450/f$ |
|   |         |      |                         | $R_6 = -0.56540 \cdot f$ | $-0.93640/f$ |
| 4 | 1.52944 | 51.8 | $d_4 = 0.04216 \cdot f$ | $R_7 = -0.27388 \cdot f$ | $+1.93311/f$ |
|   |         |      | $l_3 = 0.01054 \cdot f$ |                         |              |
| 5 | 1.64769 | 33.9 | $d_5 = 0.02108 \cdot f$ | $R_8 = -0.20824 \cdot f$ | $-3.11031/f$ |
|   |         |      |                         | $R_9 = \infty \cdot f$   | $0.00000/f$ |
| 6 | 1.71700 | 47.9 | $d_6 = 0.11576 \cdot f$ | $R_{10} = -0.28379 \cdot f$ | $+2.52652/f$ |

References Cited in the file of this patent

UNITED STATES PATENTS

| | | |
|---|---|---|
| 2,601,593 | Cook | June 24, 1952 |
| 2,635,505 | Schade | Apr. 21, 1953 |

FOREIGN PATENTS

| | | |
|---|---|---|
| 135,853 | Great Britain | Nov. 26, 1919 |